(12) United States Patent
Li

(10) Patent No.: US 8,908,327 B1
(45) Date of Patent: Dec. 9, 2014

(54) HARD DISK DRIVE MOUNTING FRAME AND ELECTRONIC DEVICE USING SAME

(71) Applicant: Hon Hai Precision Industry Co., Ltd., New Taipei (TW)

(72) Inventor: Jiunn-Her Li, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/086,977

(22) Filed: Nov. 22, 2013

(30) Foreign Application Priority Data

Sep. 25, 2013 (TW) .............................. 102134501 A

(51) Int. Cl.
*G11B 33/08* (2006.01)
(52) U.S. Cl.
USPC ....................................................... 360/99.17
(58) Field of Classification Search
USPC ....................................................... 360/99.17
See application file for complete search history.

(56) References Cited

U.S. PATENT DOCUMENTS

| | | | |
|---|---|---|---|
| 5,004,207 A * | 4/1991 | Ishikawa et al. ............... | 248/632 |
| 5,216,582 A * | 6/1993 | Russell et al. ........... | 361/679.34 |
| 6,477,042 B1 * | 11/2002 | Allgeyer et al. ......... | 361/679.34 |
| 6,798,651 B2 * | 9/2004 | Syring et al. ............. | 361/679.34 |
| 6,822,858 B2 * | 11/2004 | Allgeyer et al. ......... | 361/679.34 |
| 7,515,407 B2 * | 4/2009 | Goodman et al. ....... | 361/679.34 |

* cited by examiner

*Primary Examiner* — Mark Blouin
(74) *Attorney, Agent, or Firm* — Novak Druce Connolly Bove + Quigg LLP

(57) ABSTRACT

A hard disk drive mounting frame for supporting hard disk drive includes a bottom plate and two side plates extending upwardly from the bottom plate. The side plates and the bottom plate corporately define a receiving space to receive the hard disk drive. Each of the side plates defines a plurality of hard disk drive supporting holes. Hard disk drive securing screws pass through the hard disk drive supporting holes to engage with the hard disk drive. The bottom plate defines a plurality of frame supporting holes, the frame supporting holes is located directly under the hard disk drive and covered by the hard disk drive, frame securing screws pass through the frame supporting holes to secure the hard disk drive mounting frame to outer environment. An electronic using the hard disk drive mounting frame is also provided.

18 Claims, 4 Drawing Sheets

HARD DISK DRIVE MOUNTING FRAME AND ELECTRONIC DEVICE USING SAME

BACKGROUND

1. Technical Field

The disclosure generally relates to a hard disk drive mounting frame, and an electronic device using the hard disk drive mounting frame.

2. Description of Related Art

In a computer, one or more hard disk drives are often used for storing information. The hard disk drives are mounted in an electronic device by hard disk drive mounting frame. The hard disk drive mounting frame generally includes a plurality of mounting feets extends outwardly thereof to secure the hard disk drive mounting frame to a printed circuit board. However, the mounting feets will increase the size of the hard disk drive mounting frame and limits layout of the circuits in the printed circuit board.

What is needed, therefore, is a hard disk mounting frame to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

An embodiment of the electronic device and the hard disk drive mounting frame will now be described in detail below with reference to the drawings.

Figure 1:
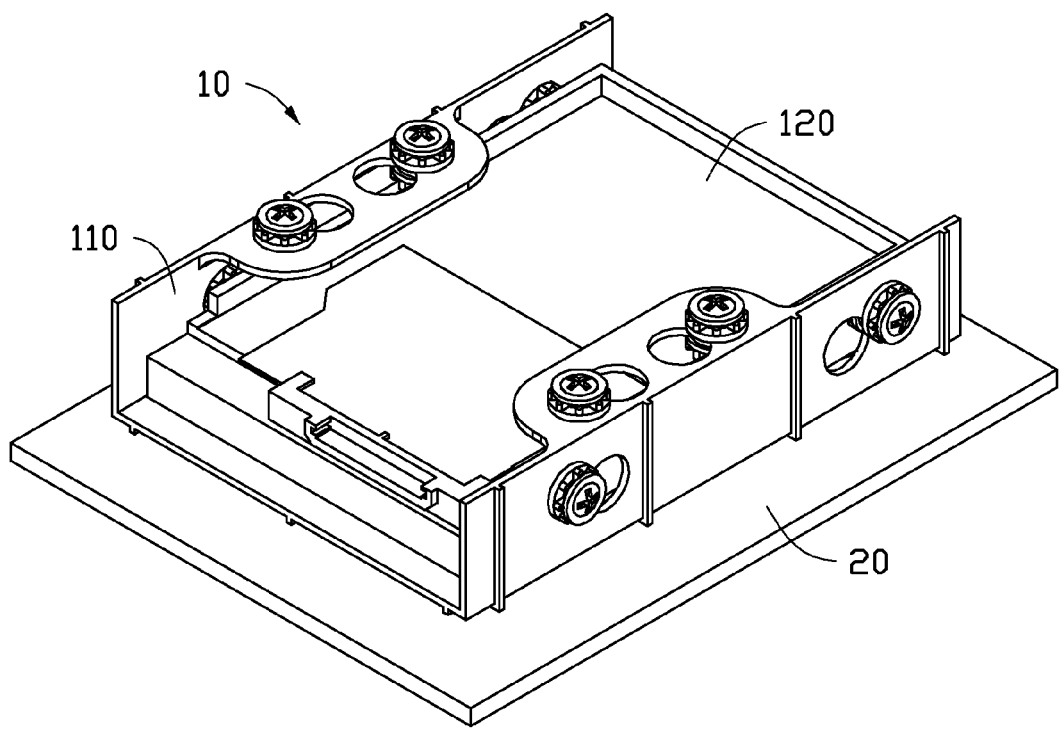
FIG. 1 is an isometric, assembled view of an electronic device in accordance with an embodiment of the present disclosure.
Figure 2:
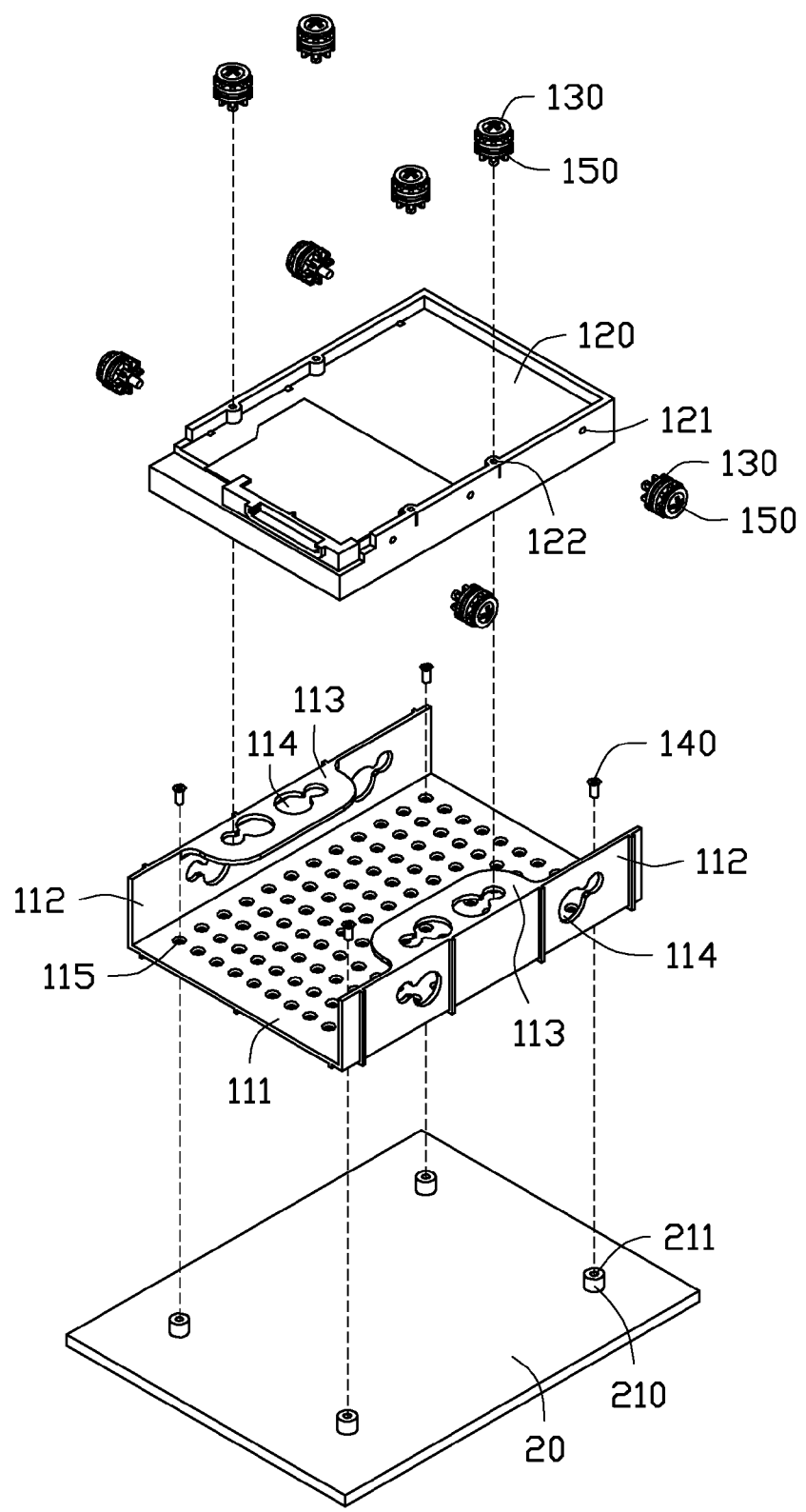
FIG. 2 is an isometric, exploded view of the electronic device of FIG. 1.

Referring to FIGS. 1-2, an electronic device 10 in accordance with an embodiment of the present disclosure is provided. The electronic device 10 includes a hard disk drive mounting frame 110, a hard disk drive 120 mounted on the hard disk drive mounting frame 110, and a printed circuit board 20 for supporting the hard disk drive mounting frame 110. The printed circuit board 20 includes a plurality of frame supporting poles 210 for supporting the hard disk drive mounting frame 110. Each frame supporting poles 210 defines a first screw hole 211 for a screw to pass through.

Figure 3:
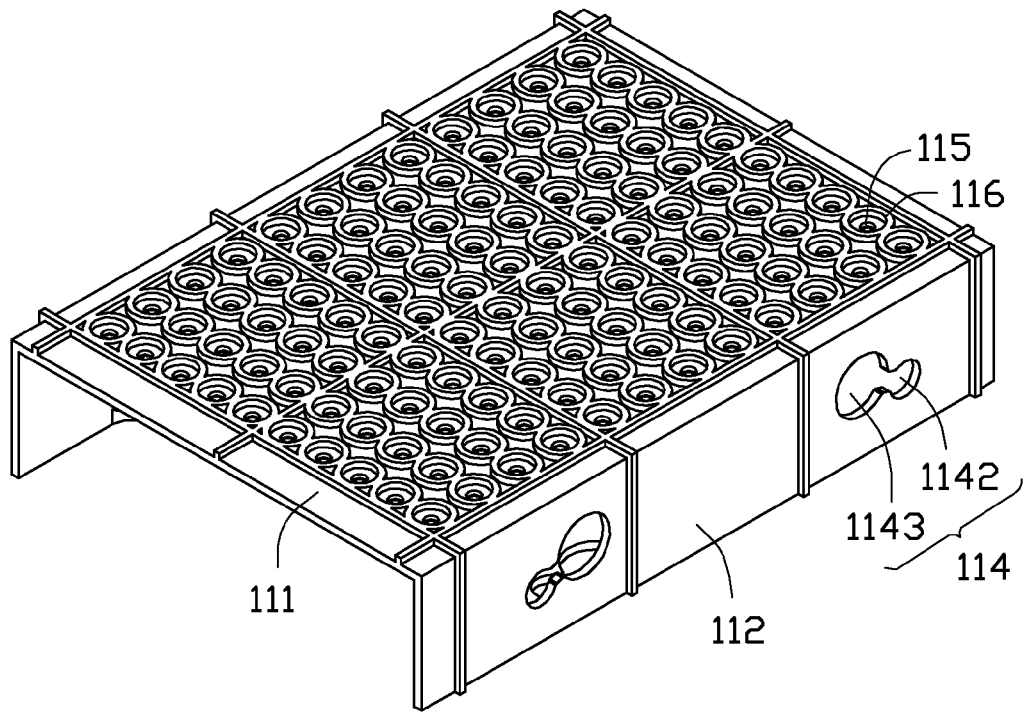
FIG. 3 is an isometric view showing a bottom of a hard disk drive mounting frame in FIG. 2.

Referring also to FIG. 3, the hard disk drive mounting frame 110 include a bottom plate 111, two side plates 112 extending upwardly from the bottom plate 111, and two top plates 113 extending inwardly and horizontally from an upper end of the side plates 112. The side plates 112 and the top plates 113 define a plurality of hard disk drive supporting holes 114. Hard disk drive securing screws 130 pass through the hard disk drive supporting holes 114 to secure the hard disk drive 120 to the hard disk drive mounting frame 110. The bottom plate 111 defines a plurality of frame supporting holes 115. The frame supporting holes 115 are located directly under the hard disk drive 120 and covered by the hard disk drive 120. Frame securing screws 140 pass through the frame supporting holes 115 to secure the hard disk drive mounting frame 110 to the printed circuit board in outer environment. Each hard disk drive supporting hole 114 includes a first through hole 1141 and a second through hole 1142. The first through hole 1141 and the second through hole 1142 are communicated with each other. A diameter of the first through hole 1141 is larger than a diameter of the second through hole 1142. The frame supporting holes 115 are arranged in matrix. In this embodiment, a plurality of positioning rings 116 is formed on a bottom surface of the bottom plate 111. Each positioning ring 116 surrounds the frame supporting hole 115, and a diameter of the inner surface of the positioning ring 116 is larger than a diameter of the frame supporting hole 115. The position ring 116 is configured to position the hard disk drive mounting frame 110 when the hard disk drive mounting frame 110 is assembled to the printed circuit board 20. In positioning of the hard disk drive mounting frame 110, the frame supporting poles 210 of the printed circuit board 20 are received in the positioning rings 116. After that, the frame securing screws 140 pass through the frame supporting holes 115 and screws into the first screw hole 211 of the frame supporting pole 210.

The hard disk drive 120 defines a plurality of second screw holes 121 at side surfaces thereof. The second screw holes 121 are configured to be passed through by hard disk drive securing screws 130 positioned at the side plate 112 of the hard disk drive mounting frame 110. The hard disk drive 120 further defines a plurality of third screw holes 122 at an upper surface thereof. The third screw holes 122 are configured to be passed through by hard disk drive securing screws 130 positioned at the top plate 113 of the hard disk drive mounting frame 110.

Figure 4:
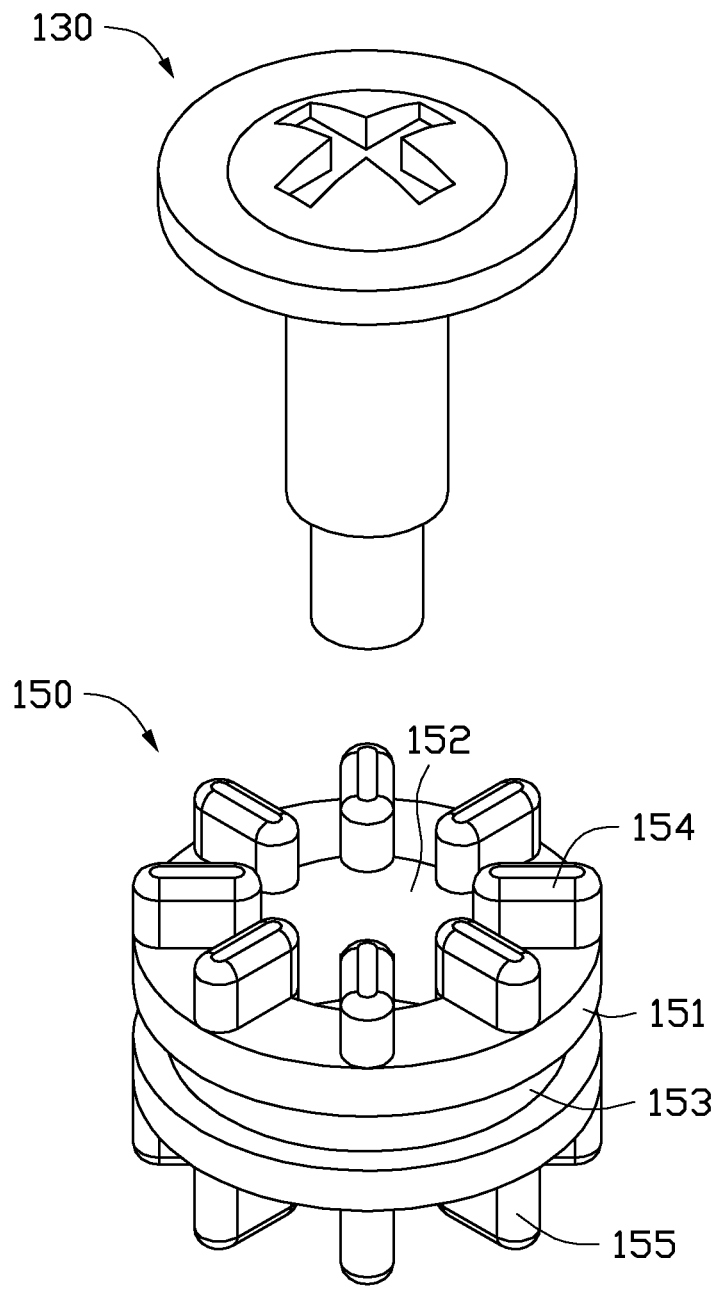
FIG. 4 is an isometric view showing a vibration pad in FIG. 2.

The hard disk drive mounting frame 110 further includes a plurality of vibration pads 150. The vibration pads 150 are made of elastic materials. Referring also to FIG. 4, each vibration pad 150 includes a columned main body 151 and a central hole 152 passing through the main body 151. The main body 151 defines an annular groove 153 at outer surface thereof. The annular groove 153 is engaged with the second through hole 1142. The hard disk drive securing screws 130 pass through the central hole 152 and engage with the second screw holes 121 or the third screw holes 122 of the hard disk drive 120. In this embodiment, a diameter of the main body 151 is less than a diameter of the first through hole 1141, and larger than a diameter of the second through hole 1142. A diameter of an inner wall of the annular groove 153 is less than a distance of the connecting portion between the first through hole 1141 and the second through hole 1142. In assembling the vibration pad 150 to the hard disk drive mounting frame 110, the main body 151 of the vibration pad 150 passes through the first through hole 1141 to make the side plate 112 corresponding to the annular groove 153. Then, since the diameter of the inner wall of the annular groove 153 is less than a distance of the connecting portion between the first through hole 1141 and the second through hole 1142, the vibration pad 150 can be moved from the first through hole 1141 to the second through hole 1142. When the vibration pad 150 is positioned in the second through hole 1142, since the diameter of main body 151 of the vibration pad 150 is larger than the diameter of the second through hole 1142, the annular groove 153 can be effectively engaged in the second through hole 1142. After that, the hard disk drive securing screws 130 pass through the central hole 152 of the main body 151 and secures the hard disk drive 120 to the hard disk drive mounting frame 110. The vibration pad 150 further includes a plurality of first abutting portions 154 and a plurality second abutting portions 155. The first abutting portions 154 are formed at one end of the main body 151 to contact with the hard disk drive securing screw 130. The second abutting portions 155 are formed at the other end of the main body 151 to contact with the hard disk drive 120. In this embodiment, the first abutting portions 154 are arranged radially around the central hole 152 of the main body 151. Similarly, the second abutting portions 155 are also arranged radially around the central hole 152 of the main body 151.

In the electronic device 10 and the hard disk drive mounting frame 110 described above, a plurality of frame supporting holes 115 are formed at the bottom plate 111 to secure the hard disk drive mounting frame 110 to the printed circuit board. Since the frame supporting holes 115 are located directly under the hard disk drive 120 and covered by the hard disk drive 120, the size of the hard disk drive mounting frame 110 is decreased. In addition, the frame supporting holes 115 can also strengthen the air flow below the hard disk drive 120. Therefore, heat generated by the hard disk drive 120 can transmit through the frame supporting holes 115 to outer environment.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive mounting frame for supporting hard disk drive, comprising:
   a bottom plate; and
   two side plates extending upwardly from the bottom plate, the side plates and the bottom plate corporately defining a receiving space to receive the hard disk drive, each of the side plates defining a plurality of hard disk drive supporting holes, hard disk drive securing screws passing through the hard disk drive supporting holes to engage with the hard disk drive;
   wherein each of the plurality of hard disk drive supporting holes comprises a first through hole and a second through hole, the first through hole and the second through hole in communication with each other, a diameter of the first through hole being larger than a diameter of the second through hole;
   the bottom plate defines a plurality of frame supporting holes, the frame supporting holes is located directly under the hard disk drive and covered by the hard disk drive, frame securing screws pass through the frame supporting holes to secure the hard disk drive mounting frame to outer environment.

2. The hard disk drive mounting frame of claim 1, further comprising two top plates extending horizontally and inwardly from a top end of the side plates respectively, the top plates defining a plurality of hard disk drive supporting holes, hard disk drive securing screws passing through the hard disk drive supporting holes to secure the hard disk drive to the hard disk drive mounting frame.

3. The hard disk drive mounting frame of claim 1, further comprising a plurality of vibration pads, each vibration pad comprising a columned main body and a central hole passing though the main body, the main body defining an annular groove at outer surface thereof, the annular groove being engaged in the second through hole, hard disk drive securing screws passing through the central hole in the main body to secure the hard disk drive.

4. The hard disk drive mounting frame of claim 3, wherein a diameter of the main body is less than a diameter of the first through hole, and larger than a diameter of the second through hole, a diameter of an inner wall of the annular groove is less than a distance of the connecting portion, in assembling the vibration pad to the hard disk drive frame, the main body of the vibration pad passing through the first through hole, and then the vibration pad moves from the first through hole to the second through hole to make the annular groove engaging in the second through hole, and then the hard disk drive securing screw pass through the central hole in the main body to secure the hard disk drive.

5. The hard disk drive mounting frame of claim 3, wherein each vibration pad further comprises a plurality of first abutting portions and a plurality of second abutting portions, the first abutting portions are formed at one end of the main body to abut the hard disk drive securing screw, the second abutting portion are formed at the other end of the main body to abut the hard disk drive.

6. The hard disk drive mounting frame of claim 5, wherein the first abutting portions and the second abutting portions are arranged radially around the central hole of the main body respectively.

7. The hard disk drive mounting frame of claim 1, wherein the frame securing hole are arranged in a matrix.

8. The hard disk drive mounting frame of claim 1, wherein a plurality of positioning ring is formed on a bottom surface of the bottom plate, each positioning ring surrounds the frame supporting hole, a diameter of an inner surface of the positioning ring is larger than a diameter of the frame supporting hole.

9. An electronic device, comprising:
   a hard disk drive, defining a plurality of screw holes; and
   a hard disk drive mounting frame for supporting hard disk drive, comprising:
      a bottom plate; and
      two side plates extending upwardly from the bottom plate, the side plates and the bottom plate corporately defining a receiving space to receive the hard disk drive, each of the side plates defining a plurality of hard disk drive supporting holes, hard disk drive securing screws passing through the hard disk drive supporting holes to engage with the hard disk drive; and
      a plurality of positioning rings formed on a bottom surface of the bottom plate, each of the plurality of positioning rings surrounding one of the frame supporting holes;
      wherein the bottom plate defines a plurality of frame supporting holes, the frame supporting holes is located directly under the hard disk drive and covered by the hard disk drive, frame securing screws pass through the frame supporting holes to secure the hard disk drive mounting frame to outer environment.

10. The hard disk drive mounting frame of claim 9, further comprising two top plates extending horizontally and inwardly from a top end of the side plates respectively, the top plates defining a plurality of hard disk drive supporting holes, hard disk drive securing screws passing through the hard disk drive supporting holes to secure the hard disk drive to the hard disk drive mounting frame.

11. The hard disk drive mounting frame of claim 9, wherein each hard disk drive supporting hole comprises a first through hole and a second through hole, the first through hole and the second through hole are communicated with each other, a diameter of the first through hole is larger than a diameter of the second through hole.

12. The hard disk drive mounting frame of claim 11, further comprising a plurality of vibration pads, each vibration pad comprising a columned main body and a central hole passing though the main body, the main body defining an annular groove at outer surface thereof, the annular groove being engaged in the second through hole, hard disk drive securing screws passing through the central hole in the main body to secure the hard disk drive.

13. The hard disk drive mounting frame of claim 12, wherein a diameter of the main body is less than a diameter of the first through hole, and larger than a diameter of the second through hole, a diameter of an inner wall of the annular groove is less than a distance of the connecting portion, in assembling the vibration pad to the hard disk drive frame, the main body of the vibration pad passing through the first through hole, and then the vibration pad moves from the first through hole to the second through hole to make the annular groove engaging in the second through hole, and then the hard disk drive securing screw pass through the central hole in the main body to secure the hard disk drive.

14. The hard disk drive mounting frame of claim 12, wherein each vibration pad further comprises a plurality of first abutting portions and a plurality of second abutting portions, the first abutting portions are formed at one end of the main body to abut the hard disk drive securing screw, the second abutting portion are formed at the other end of the main body to abut the hard disk drive.

15. The hard disk drive mounting frame of claim 14, wherein the first abutting portions and the second abutting portions are arranged radially around the central hole of the main body respectively.

16. A hard disk drive mounting frame for supporting a hard disk drive, comprising:
    a bottom plate; and
    two side plates extending upwardly from the bottom plate, the side plates and the bottom plate corporately defining a receiving space to receive the hard disk drive, each of the side plates defining a plurality of hard disk drive supporting holes, hard disk drive securing screws passing through the hard disk drive supporting holes to engage with the hard disk drive,
    wherein each of the plurality of hard disk drive supporting holes comprises a first through hole and a second through hole, the first through hole and the second through hole in communication with each other, the bottom plate defining a plurality of frame supporting holes, frame securing screws passing through the frame supporting holes to secure the hard disk drive mounting frame to an outer environment.

17. The hard disk drive mounting frame of claim 16, wherein a diameter of the first through hole is larger than a diameter of the second through hole.

18. The hard disk drive mounting frame of claim 16, wherein the frame supporting holes are located directly under the hard disk drive and covered by the hard disk drive.

\* \* \* \* \*